(12) United States Patent
George

(10) Patent No.: US 9,185,210 B2
(45) Date of Patent: Nov. 10, 2015

(54) THIRD PARTY CALL CONTROL AND STATUS SIGNALING

(75) Inventor: Richard John George, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 961 days.

(21) Appl. No.: 12/971,399

(22) Filed: Dec. 17, 2010

(65) Prior Publication Data

US 2011/0244836 A1    Oct. 6, 2011

Related U.S. Application Data

(60) Provisional application No. 61/320,235, filed on Apr. 1, 2010.

(51) Int. Cl.
*H04M 3/42* (2006.01)
*H04W 4/00* (2009.01)
*H04M 7/12* (2006.01)
*H04L 29/06* (2006.01)
*H04M 1/57* (2006.01)
(Continued)

(52) U.S. Cl.
CPC ........... *H04M 3/4234* (2013.01); *H04L 65/104* (2013.01); *H04L 65/1006* (2013.01); *H04L 65/1056* (2013.01); *H04M 7/127* (2013.01); *H04M 1/57* (2013.01); *H04M 1/72522* (2013.01); *H04M 3/42314* (2013.01); *H04M 7/006* (2013.01); *H04M 2203/1091* (2013.01); *H04M 2203/654* (2013.01)

(58) Field of Classification Search
USPC .............................................. 455/414.1, 466
See application file for complete search history.

(56) References Cited

U.S. PATENT DOCUMENTS

| 5,438,568 A | 8/1995 | Weisser, Jr. |
| 6,055,413 A * | 4/2000 | Morse et al. ................. 340/7.43 |

(Continued)

FOREIGN PATENT DOCUMENTS

IN    200701984 I1  *  7/2009

OTHER PUBLICATIONS

Extended European Search report mailed Jul. 27, 2011. In corresponding application No. 10195767.8.
Colville, Ian; "The Aculab SIP Bridge—for third party call control"; Sep. 2005.
"ISDN Generic Transparency Descriptor (GTD) for Setup Message"; Cisco IOS Release 12.2(15)T.

(Continued)

*Primary Examiner* — Christopher M Brandt
*Assistant Examiner* — Matthew Genack
(74) *Attorney, Agent, or Firm* — Fish & Richardson P.C.

(57) ABSTRACT

Aspects relate to call control by third parties, where IP or a similar transport is used over a part of the channel for a given call and circuit-switched signaling protocols are used on a different part. For example, a PBX can communicate using SIP signaling to a gateway to a PSTN network, to which a Public Land Mobile Network (PLMN) is coupled, and which a mobile device, uses for voice communication. Controlling or updating status in these kinds of situations can be accomplished by forming a Q.931/932 message, such as a FACILITY message, which has fields (Information Elements) for pre-defined purposes (other than third party call control), and providing control or status information in such field(s). The message (the info) is tunneled through the gateway and the network(s), and arrives at its destination device. That device determines that a field does not comport with a valid format interpretation, and on that basis, can determine that the field has contents to be interpreted as call control or status information.

9 Claims, 5 Drawing Sheets

(51) Int. Cl.
*H04M 1/725* (2006.01)
*H04M 7/00* (2006.01)

(56) References Cited

U.S. PATENT DOCUMENTS

| | | | |
|---|---|---|---|
| 6,411,692 B1 | 6/2002 | Scherer | |
| 7,082,119 B1 | 7/2006 | Tamsil | |
| 7,710,856 B2 | 5/2010 | Mueller | |
| 2002/0089939 A1 | 7/2002 | Foti | |
| 2006/0234703 A1 | 10/2006 | Wuthnow et al. | |
| 2008/0002742 A1 | 1/2008 | Wu | |
| 2008/0008304 A1 | 1/2008 | Deutsch et al. | |
| 2008/0287148 A1* | 11/2008 | Silver et al. | 455/466 |
| 2010/0124318 A1* | 5/2010 | Cai et al. | 379/93.24 |
| 2010/0277562 A1* | 11/2010 | Jabri et al. | 348/14.01 |
| 2013/0182654 A1* | 7/2013 | Hariharan et al. | 370/329 |

OTHER PUBLICATIONS

"PGW 2200 Softswitch Generic Transparency Descriptor ISUP Transparency"; Cisco Systems, Inc.; Feb. 2, 2006.

Rosenberg, et al.; "Best Current Practices for Third Party Call Control (3pcc) in the Session Initiation Protocol (SIP)"; Apr. 2004; retrieved from http://www.rfc-editor.org/rfc/rfc3725.txt on Feb. 1, 2010.

"Transparent Tunneling of QSIG and Q.931 over SIP TDM Gateway and SIP-SIP Cisco Unified Border Element"; Cisco Systems, Inc., San Jose, CA, US; Feb. 13, 2008.

"ISDN Q-Interface Signaling Protocol Q.931 Tunneling over the IP Network: Reduce the Cost of Private Telephony Networks"; Cisco Systems, Inc.; US; 2008.

Office Action mailed Apr. 19, 2013, in corresponding Canadian patent application No. 2,726,036.

* cited by examiner

THIRD PARTY CALL CONTROL AND STATUS SIGNALING

CROSS REFERENCE TO RELATED APPLICATIONS

This application claims priority from U.S. Provisional Pat. App. Ser. No. 61/320,235, filed on Apr. 1, 2010, the contents of which are incorporated herein in their entirety for all purposes.

BACKGROUND

1. Field

The present application relates to voice telephony, and more particularly to transport of control and status information for third party call control over packet switched networks.

2. Related Art

Voice telephony remains a major application of interest for business and personal use. In an example corporate setting, a telephony installation at a site can have a large number of users connected to a Private Branch Exchange (PBX) server, which can interface those users to a smaller number of outside lines (e.g., an E1 or T1 line) (a PBX can be implemented using a server with telephony cards for example, and more generally, functions that are often attributable to a PBX can be distributed to different entities in a connected system, and the term PBX is used for convenience herein, rather than by way of limitation). Such a corporation can have multiple sites with multiple PBX servers. The PBX at each site can provide a variety of services to users, such as call forwarding, park, conferencing, and so on.

It is increasingly desirable to extend these kinds of PBX services (or other services that may be available from a PBX) to mobile devices. For example, a service that allows a PBX to dial out on behalf of a mobile device, and bridge a call at the PBX is helpful for mobile users. Providing control and status information from the PBX (or from other control points) to the devices involved in such a call continues to be an area open for further improvements.

BRIEF DESCRIPTION OF THE DRAWINGS

Reference will now be made, by way of example, to the accompanying drawings which show example embodiments of the present application, and in which.

DESCRIPTION

Figure 1:
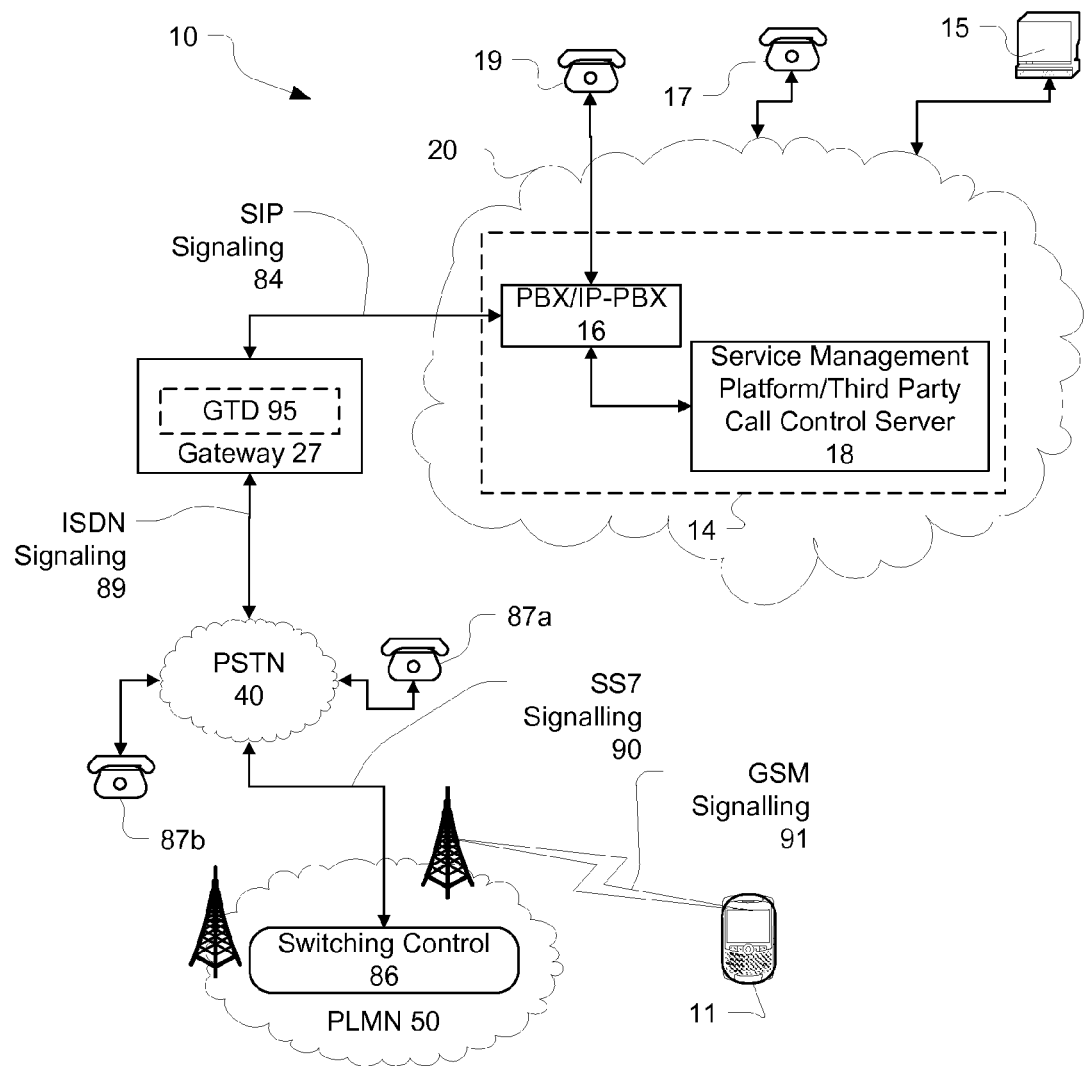
FIG. 1 shows, in block diagram form, an example system for managing enterprise-related mobile calls, including an enterprise communications platform.

In general, the present application relates to the control and management of communications. In one exemplary aspect, the present application relates to a telephony method for implementation on a mobile device or at a server for exchanging call control and call status.

Voice telephony controls and status information is often still expressed in signaling formats determined for use over circuit-switched networks, such as ISDN networks. One example signaling format is Q.931 signaling, which is used for ISDN networks. Increasingly, devices that may use ISDN signaling, such as a Private Branch Exchange (PBX), may connect to the ISDN network via a packet switched network, using a gateway to convert the packet switched control and media flows to the circuit switched control and media flows. For example, H.245 or SIP signaling may be used in a packet switched network, such as the Internet. In many cases, content carried in messages for H.245 or SIP signaling is similar to content of Q.931 messages. Similarly, content of GSM signaled messages are based on Q.931 messages.

Traditionally, a PBX provides telephony services for a closed group of private telephones, for example, within an enterprise or a hotel. However, in many cases the services to the private telephone desirably could also be extended out to a mobile device that communicate via third party networks, such as wide area cellular networks, or through wireless local area networks. In these situations a Fixed Mobile Convergence (FMC) server may be added as an adjunct to the PBX and can take an active role in providing services to mobile devices.

The FMC server can be connected to the PBX through a packet-switched connection that can use the Internet Protocol (IP). In many cases, the FMC server provides services to mobile devices, but is not a participant in calls to such mobile devices. For example, the FMC server can command the PBX to call a first device, and when the call is established, it can command the PBX to call a second device, and when the second device answers, the FMC server can command the PBX to bridge the calls, thereby putting the first device and the second device into a call. These kinds of situations can be referred to as "third party" call situations, because there is a third party, the FMC server, that can affect the setup, progress of, or otherwise control the call, in which it is not a participant.

In such a situation, the FMC server is a third party to the call, while the first device and the second device are parties to the call. Further, although the FMC server (or a server that has a signal pathway to the PBX) may, in some cases, be able to have a data connection to the devices that are party to a call (separate from a connection carrying the voice communications), availability of a data channel cannot be assumed.

In absence of a data channel, the FMC server can command the PBX to (or devices party to the call can) inject DTMF tones on the voice channel for sending command or status information, but DTMF tones are susceptible to corruption and generally are slow. Such DTMF tones may also be audible to users of the devices, which can cause an unpleasant user experience.

Command and status information for third party calls also could be transferred in fields of ISDN messages, which provide pre-defined fields for carrying such information, for example, User-to-User Information Element as part of the SETUP message. However, these fields often are filtered by network carriers seeking to prevent users from being able to transmit information in those fields as a way of bypassing setting up the actual call, and thereby avoiding the network carriers' charge.

In some cases, gateways that interface ISDN network portions to IP network portions allow tunneling of ISDN messages over the IP network portions, some of which is standardized, IETF RFC3398 and ITU Q.GTD being examples of such standardization. This standardization is intended to allow IP call control signaling to replace ISDN signaling over some portion of the signaling path, for example, one application of such tunneling is to connect two PBXes at two different ent sites owned by the same company. In such an approach, usage of dedicated circuit(s) between the PBXes can be reduced or eliminated, and instead, the circuit switched line(s) between each PBX is replaced by a virtual packet switched IP connection between an entry point (e.g., a gateway) to the IP network at the first PBX and an exit point at the second PBX.

This functionality can be used advantageously in implementations according to this disclosure. Circuit-switched control and status messages conform to a standard message format, such that each type of message has pre-defined fields, (also called Information Elements (IE) herein), which describe what kind of information is provided in each field (how data provided in such IE is to be interpreted). For example, a Calling party number field of a Q.931 SETUP message provides the phone number of the party making the call to the entity receiving the message. The contents of such messages are to be received by the devices, rather than being consumed in/used by the network (i.e., even if a network tunnels, or otherwise changes protocols for transporting a message along a communication path between a PBX and another device, the information originally provided in the message would generally remain intact). Most of the Information Elements are strongly defined in ITU Q.931 and Q.932, have significance to the system, and are not modifiable in order to be used for other purposes.

Therefore, in order to implement the information exchanges contemplated herein, certain IEs are overridden with third party call control signaling between the FMC server and the mobile device. The information sought to be exchanged preferably is encoded in a format that is invalid, or which otherwise does not conform with a specification or standard for that given IE (message field), or which can be detected as bearing a message for a purpose other than the assigned purpose of that message field, but still is consistent with the definition of the field given in the ITU specifications and will port across the different protocols, such as SIP, ISDN, SS7 and GSM.

An entity receiving the message can detect that the field includes information that does not conform to information what would be expected in that field under the appropriate standard, and can instead choose to interpret the contents of that field according to a pre-arranged signaling convention, such as for accomplishing third party call control and status updates, herein.

The message that is most suitable to work as a signaling channel is the FACILITY message. The FACILITY message is defined in ISDN in Q.932, in GSM 3GPP TS24.008 and carried over the equivalent ISUP SS7 message, defined in ITU Q.763. The FACILITY message may be sent to request or acknowledge a supplementary service.

The most common use of this message is to convey caller identity information during call establishment or during the active part of the call, for display to the user. For example, if the call is transferred, the new caller identity would be passed in the FACILITY message. In the case of third party call control signaling, the phone number can be made to violate an applicable dial plan (numbering plan), such that it can be detected that the caller identity information is not a valid phone number (e.g., in the U.S., it is generally invalid to have a "1" as the first digit of an area or exchange code). Thus, digits provided in the Display Information Element (defined in Q.931) can then be interpreted as control or status information and responsively be consumed by the third party call control server, rather than being used to update a display of caller identifying information. A sequence of such messages can be sent in either direction, and the information provided in them can be interpreted collectively or individually.

Reference is now made to FIG. 1, which shows, in block diagram form, an example system, generally designated 10, for the control and management of communications. The system 10 includes an enterprise or business network 20, which in many embodiments includes one or more a Local Area Network(s) (LAN). In the description below, the enterprise or business system 20 may be referred to as an enterprise network 20. It will be appreciated that the enterprise network 20 may include more than one network and may be located in multiple geographic areas in some embodiments.

The enterprise network comprises a PBX 16, which can be implemented as an IP PBX (i.e., it uses packet network signaling protocols, such as SIP (Session Initiation Protocol)), a Service Management Platform 18 couples with the PBX 16. The Service Management Platform also can be known as a Third Party Call Control Server (3PCC server), in recognition of its role here as a controller of third party calls. PBX 16 and 3PCC server 18 can communicate using SIP.

In this example, PBX 16 uses SIP signaling 84 over a channel to communicate with a gateway 27, which transitions SIP signaling 84 to ISDN signaling 89 (which typically is implemented using Signaling System 7 (SS7)), by which gateway 27 communicates with a public switched telephone network (PSTN) 40. PSTN 40 is depicted to have telephones 87a and 87b coupled thereto. Gateway 27 includes a transparency descriptor (can be a generic transparency descriptor (GTD)) 95, which can accept messages in ISDN signaling formats and tunnel messages over SIP signaling, or conversely can accept SIP signaling messages and convert that signaling to ISDN signaling. For example, SIP signaling 84 can signal, within an INFO message, contents that will be translated by GTD 95 into a FACILITY message for transport over PSTN 40.

In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 can be circuit-switched calls. Within the enterprise, e.g. between the PBX 16 and terminal devices, voice calls are increasingly packet-switched calls, for example Voice-over-IP (VoIP) calls.

PSTN 40 uses SS7 signaling 90 to communicate with a public land mobile network (PLMN) 50, which may also be referred to as a wireless wide area network (WWAN) or, in some cases, a cellular network. For example, PLMN 50 may be operated by a particular carrier, on a spectrum acquired for providing voice services. The connection with the PLMN 50 may be made via a relay 26.

The 3PCC server 18 can perform some aspects of messaging or session control, like call control and advanced call processing features. The 3PCC server 18 may, in some cases, also perform some media handling. Collectively the 3PCC server 18 and PBX 16 may be referred to as the enterprise communications platform (server), generally designated 14. It will be appreciated that the enterprise communications platform 14 and, in particular, the 3PCC server 18, is implemented on one or more servers having suitable communications interfaces for connecting to and communicating with the PBX 16 and/or DID/PRI trunks. Although the 3PCC server 18 may be implemented on a stand-alone server, it will be appreciated that it may be implemented into an existing control agent/server as a software component comprising instructions configuring a processor. As will be described below, the 3PCC server 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs).

One of the functions of enterprise communications platform 14 is to extend the features of enterprise telephony to the mobile devices 11. For example, the enterprise communications platform 14 cay allow mobile device 11 to perform functions akin to those normally available on a standard office telephone, such as the digital telephone set 17 or analog telephone set 15. Example features may include direct extension dialing, enterprise voice mail, conferencing, call transfer, call park, etc The depicted system may include a number of enterprise-associated mobile devices (device 11 is depicted). Device 11 can be a device equipped for cellular communication through the PLMN 50, or a dual-mode device capable of both cellular and WLAN communications.

Mobile device 11 includes one or more radio transceivers and associated processing hardware and software to enable wireless communications with the PLMN 50 and optionally a WLAN. In various embodiments, the PLMN 50 and mobile device 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across other PLMNs.

In some instances, the dual-mode mobile devices 11 and/or the enterprise network 20 are configured to facilitate roaming between the PLMN 50 and a WLAN, and are thus capable of seamlessly transferring sessions (such as voice calls) from a connection with a cellular interface of a dual-mode device to a WLAN interface of such a dual-mode device, and vice versa.

As introduced above, the example system depicted in FIG. 1 includes signaling mechanisms comprising SIP signaling 84, between gateway 27 and PBX 16, ISDN signaling 89 between gateway 27 and PSTN 40, SS7 signaling 90 between PSTN 40 and switching control 86, and GSM signaling 91 between switching control 86 and device 11.

GSM signaling 91 can be implemented using the Fast Associated Control Channel (FACCH). FACCH is a logical channel on a digital traffic channel that can be used to send urgent signaling control messages. The FACCH channel sends messages by replacing speech data with signaling data for short periods of time. In GSM, two special reserved bits are used to inform the receiving device if the data in the current time slot is digitally coded subscriber traffic or alternatively a FACCH message.

Switching control 86 manages the conversion between GSM signaling 91 and SS7 signaling 90 (for clarity, a network of base stations operating within PLMN 50 is not separately depicted, and usually, there is a connection between switching control 86, and one or more base station elements, where device 11 can be connected to such base station elements. GSM signaling can be relayed through the base station to a termination point in switching control 86.)

Between switching control 86 and through PSTN 40, SS7 signaling 90 can be implemented. For example, a number of discrete switching elements can route a voice call through PSTN 40 to a connection point for gateway 27. Gateway 27 and PSTN 40 then can exchange signaling and control information using ISDN signaling 89. ISDN signaling 89 uses ISDN User Part (ISUP). SIP signaling 84 provides a SIP INFO message, which gateway 27 can convert to an ISUP message (such as a FACILITY message or a SETUP message). A Generic Transparency Descriptor allows such an ISUP message to be conveyed through SIP signaling 84, and be passed through the ISDN, SS7, and GSM signaling paths depicted. Similarly, a GSM message can be originated at device 11, which encodes Information Elements appropriate for a FACILITY message or a SETUP message, and those Information Elements will be provided over SS7 signaling 90, and ISDN signaling 89 to gateway 27. Gateway 27 then can use SIP signaling 84 to transfer the contents of such message to PBX 16, and from PBX 16 to 3PCC 18.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

Figure 2:
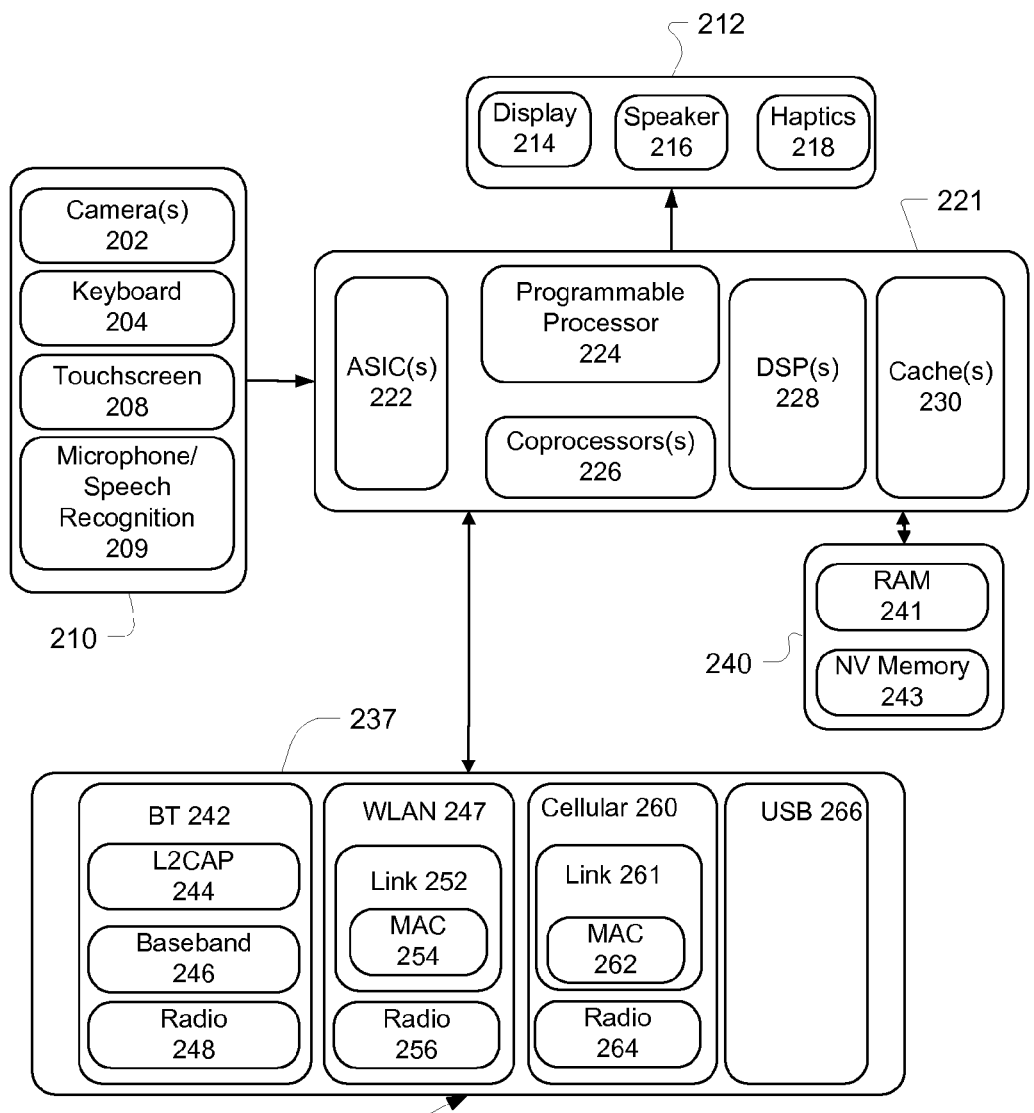
FIG. 2 depicts example of components of an example mobile device.

FIG. 2 depicts example components that can be used in implementing a mobile transceiver device 109 according to the above description. FIG. 2 depicts that a processing module 221 may be composed of a plurality of different processing elements, including one or more ASICs 222, a programmable processor 224, one or more co-processors 226, which each can be fixed function, reconfigurable or programmable, one or more digital signal processors 228. For example, an ASIC or co-processor 222 may be provided for implementing graphics functionality, encryption and decryption, audio filtering, and other such functions that often involve many repetitive, math-intensive steps. Processing module 221 can comprise memory to be used during processing, such as one or more cache memories 230.

Processing module 221 communicates with mass storage 240, which can be composed of a Random Access Memory 241 and of non-volatile memory 243. Non-volatile memory 243 can be implemented with one or more of Flash memory, PROM, EPROM, and so on. Non-volatile memory 243 can be implemented as flash memory, ferromagnetic, phase-change memory, and other non-volatile memory technologies. Non-volatile memory 243 also can store programs, device state, various user information, one or more operating systems, device configuration data, and other data that may need to be accessed persistently.

User input interface 210 can comprise a plurality of different sources of user input, such as a camera 202, a keyboard 204, a touchscreen 208, and a microphone, which can provide input to speech recognition functionality 209.

Processing module 221 also can use a variety of network communication protocols, grouped for description purposes here into a communication module 237, which can include a Bluetooth communication stack 242, which comprises a L2CAP layer 244, a baseband 246 and a radio 248. Communications module 237 also can comprise a Wireless Local Area Network (247) interface, which comprises a link layer 252 with a MAC 254, and a radio 256. Communications module 237 also can comprise a cellular broadband data network interface 260, which in turn comprises a link layer 261, with MAC 262. Cellular interface 260 also can comprise a radio for an appropriate frequency spectrum 264. Communications module 237 also can comprise a USB interface 266, to provide wired data communication capability. Other wireless and wired communication technologies also can be provided, and this description is exemplary.

Figure 3:
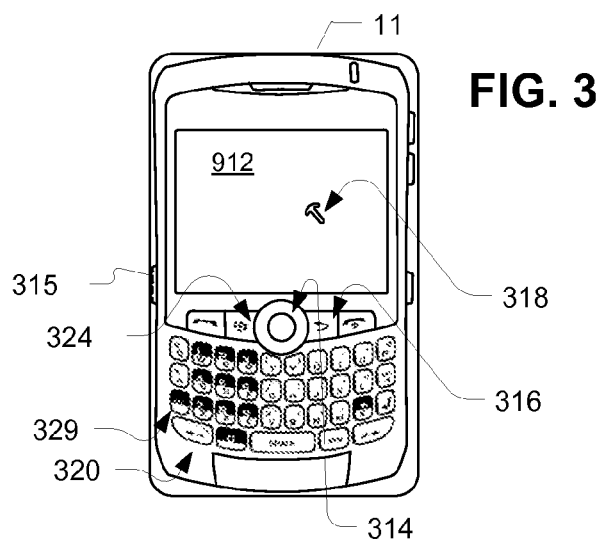
FIG. 3 depicts an example form factor of a mobile device.

Referring to FIG. 3, there is depicted an example of mobile device 11. Mobile device 11 comprises a display 312 and a cursor or view positioning device, here depicted as a trackball 314, which may serve as another input member and is both rotational to provide selection inputs and can also be pressed in a direction generally toward housing to provide another selection input. Trackball 314 permits multi-directional positioning of a selection cursor 318, such that the selection cursor 318 can be moved in an upward direction, in a downward direction and, if desired and/or permitted, in any diagonal direction. The trackball 314 is in this example situated on a front face (not separately numbered) of a housing 320, to enable a user to maneuver the trackball 314 while holding mobile device 11 in one hand. In other embodiments, a trackpad or other navigational control device can be implemented as well.

The mobile device 11 in FIG. 3 also comprises a programmable convenience button 315 to activate a selected application such as, for example, a calendar or calculator. Further, mobile device 11 can include an escape or cancel button 316, a menu or option button 324 and a keyboard 320. Menu or option button 324 loads a menu or list of options on display 312 when pressed. In this example, the escape or cancel button 316, menu option button 324, and keyboard 329 are disposed on the front face of the mobile device housing, while the convenience button 315 is disposed at the side of the housing. This button placement enables a user to operate these buttons while holding mobile device 11 in one hand. The keyboard 329 is, in this example, a standard QWERTY keyboard.

Figure 4:
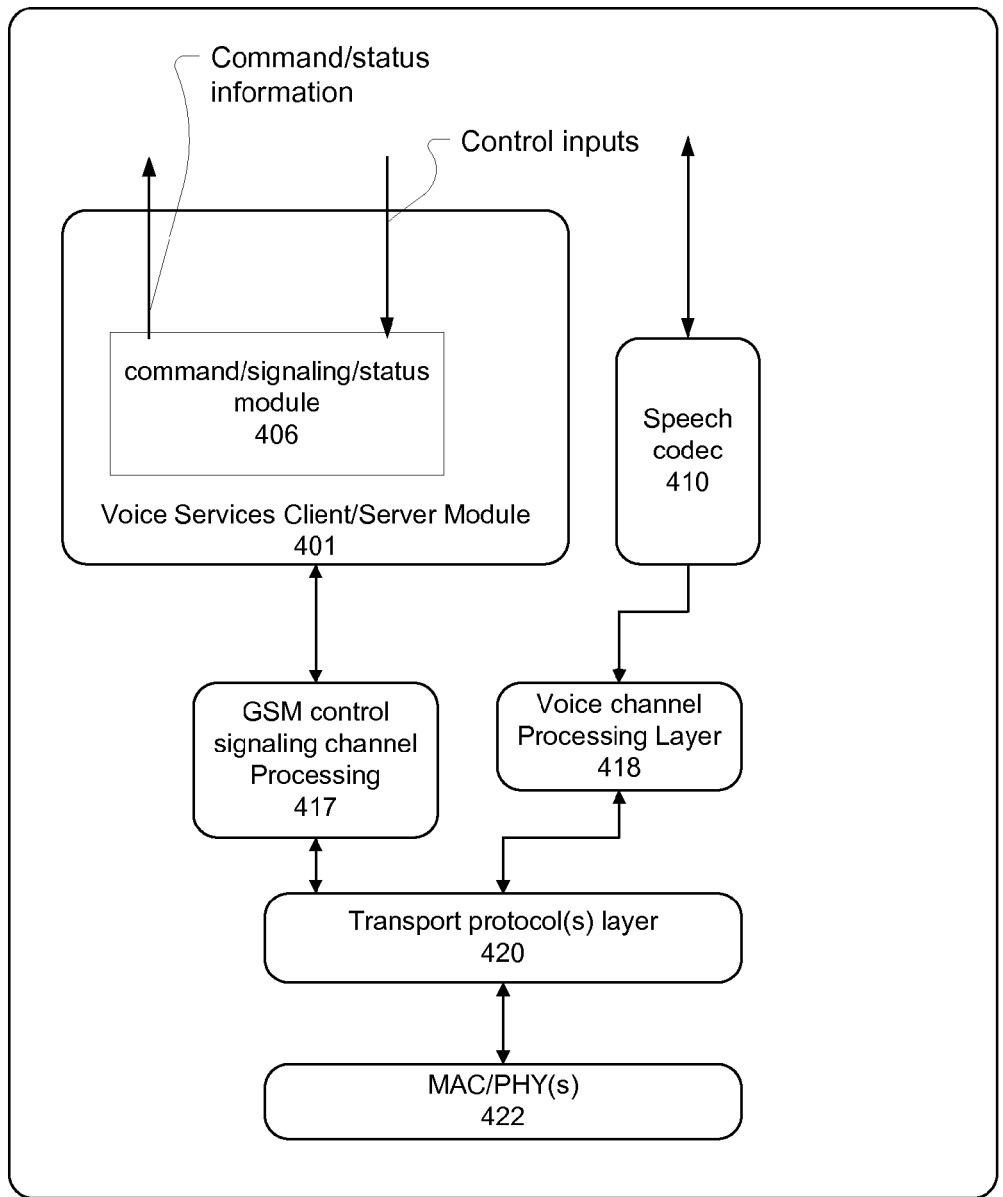
FIG. 4 depicts an example function module organization for implementing devices according to these disclosures.

FIG. 4 depicts an example functional module organization of mobile device 11. Mobile device 11 includes a voice services client/server module 401, which provides voice services that can be used with third party controlled features. Module 401 can be implemented by instructions obtained from a tangible computer readable medium, used to configure programmable processor 224 (FIG. 2). Module 401 can be configured to receive inputs from any of input 210 devices of FIG. 2, in accordance with a user interface that provides an appropriate context for such inputs. For example, display 214 can be provided with a menu item which will receive user input indicative of a command to transfer a call. Such input is then processed by module 401 into a format of a field of a GSM message includes an ISDN command/signaling/status module 1006. The depicted device 11 also includes a voice channel processing layer module 1018, which interfaces with transport protocol(s) module 1020. Transport module in turn interfaces with one or more MAC/PHY modules 1022 (see also FIG. 8). Collectively, voice channel processing module 1018, transport module 1020, and MAC/PHY module(s) 1022 provide a stack for transmission and reception of voice information for a call, as well as command and status information relating to such call.

In particular, voice channel processing module 1018 can accept input from a speech codec 1010, that can encode and decode voice signal information sent and received over the voice channel. Module 1018 also can provide received command and status signals to voice services client 1001 for interpretation and for effecting such commands or otherwise using such status information.

Voice calls can be setup using GSM signaling between device 11 and switching control 86; GSM signaling commands are defined in 3GPP TS24.008. Contents of messages carried in GSM signaling can be carried over the other signaling channels depicted in FIG. 1. Upon establishing a voice call, many devices, even if they support data communication in general, do not support simultaneous voice and data communications. For example, GSM devices typically do not support a simultaneous voice and data connection. However, in some usage scenarios, 3PCC 18 may need to send status and/or control information to devices that are participating in a call. Because it is not always the case that devices 11 and 13 may be able to receive such control and/or status information over a separate data channel, if such information is to be provided, the information would need to be provided by an available signaling mechanism. The following describes that such a signaling mechanism can be provided using coded messages, stored in fields of Q.931 messages that are typically used for other purposes.

For example, a FACILITY message, in normal practice, can be used to update a device with new caller-ID information that would be stored in a Display information element of the FACILITY message. Typically, when a device, e.g., device 11, receives such a FACILITY message, it would access the Display information element and use the information found in that field to update a display of caller-ID information. SIP gateways can provide a mechanism for tunneling such Q.931/Q.932 messages across an IP network.

For example, a Generic Transparency Descriptor (as defined in ITU Q.GTD.1 and Q.GTD.2) allows ISDN messages (Q.931/2 signaling) to be carried over SIP. For example, information such as called and calling party number, and redirect number can be tunneled from an ingress GW element to an egress GW element.

Thus, in one implementation, PBX can form a Q.931/932 message with a pre-defined field having specially-formatted information. The special formatting of the information allows detection that the information is not relevant to the normal uses of information in the pre-defined field. In a particular example, the Display Information Element of a FACILITY message would typically include a phone number. Phone numbers conform to a dial plan for the region, e.g., country, in which they are located. Therefore, it is possible to detect when a telephone number is not according to the dial plan. In one implementation, the Display Information Element is made to store digits that do not represent a valid phone number in the dial plan. Then, a receiver of the message with what appears at first to be updated caller-ID information can examine the digits in the field that typically holds such caller-ID information and detect that the phone number stored there is invalid.

Although typically, such a receiving device may ignore such an invalid phone number, or alert that an error has occurred, in this example, the receiving device would instead process the phone number as though it contained control or status information relevant to an ongoing call. A reverse flow of status or control information also can be provided from mobile devices to a PBX using similar techniques.

In summary, a PBX can interface with a SIP network through a gateway element that can map Q.931/Q.932 signaling messages into SIP messages, such that metadata in the messages (e.g., field identifiers) and the data in such fields can be passed over the SIP network, and ultimately be received by receiving device(s). Similarly, the gateway element can receive ISDN messages and map those messages into a SIP message that is provided to the PBX (or to another entity in communication with the gateway element)

The messages can be formatted so that the receiving device(s) can detect that the one or more fields in the message do not store valid information, if interpreted according to the standard interpretation of those fields. Responsive to such a determination, the information in such field(s) can be interpreted instead as control or status information from a third party (the PBX) to the call. This same approach can be used to transfer control/status information from devices to a PBX, such that the naming of the devices in this description is for clarity of explanation, and not limitation.

Figure 5:
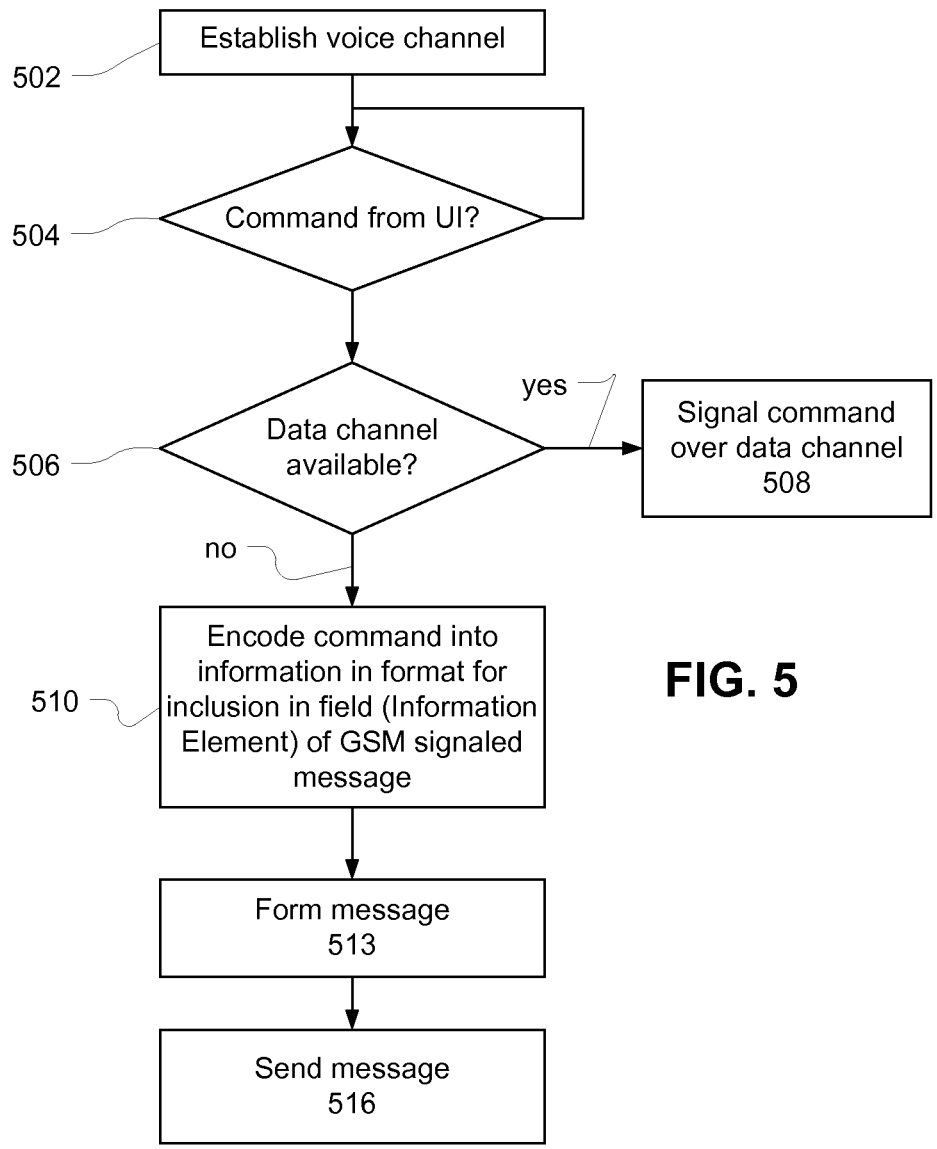
FIG. 5 depicts an example process for sending commands according to these disclosures.

FIG. 5 depicts an example process of forming a command and sending the command from one entity to another (such as from a device 11 or device 13 to the PBX of FIG. 11). The process depicted includes that a voice channel can be established 502. A command can be received (504) from a user interface of device 11.

In this example, it can be determined whether a data channel is available (506) for information indicative of the command. If there is such a data channel available, then it can be used to transmit the command. However, if there is not a data channel currently available, then the information indicative of the command can be encoded (510) into a format for inclusion in a field of a GSM message, which is formed (513), and sent (516). As described above, examples of messages that can be used include the FACILITY and SETUP messages (from the device, per 3GPP TS24.008), and the respective fields in each that are preferably used are the caller-ID and the redirect fields.

As discussed, ISDN ISUP, SS7, and GSM all provide for FACILITY and SETUP messages with fields that are strongly defined to include certain information. GSM signaling is used at device 11, and therefore GSM is referenced, although it would be understood more generally that the usage of the FACILITY or SETUP message can be understood from referencing SS7 and ISDN ISUP signaling definitions, as well.

The information can be encoded (510) as an invalid phone number, with one or more digits that can be interpreted according to a pre-determined or prearranged encoding scheme. For example, a command to put a call on hold (or take off a hold) received from a UI of device 11 can be sent to the PBX 16.

Figure 6:
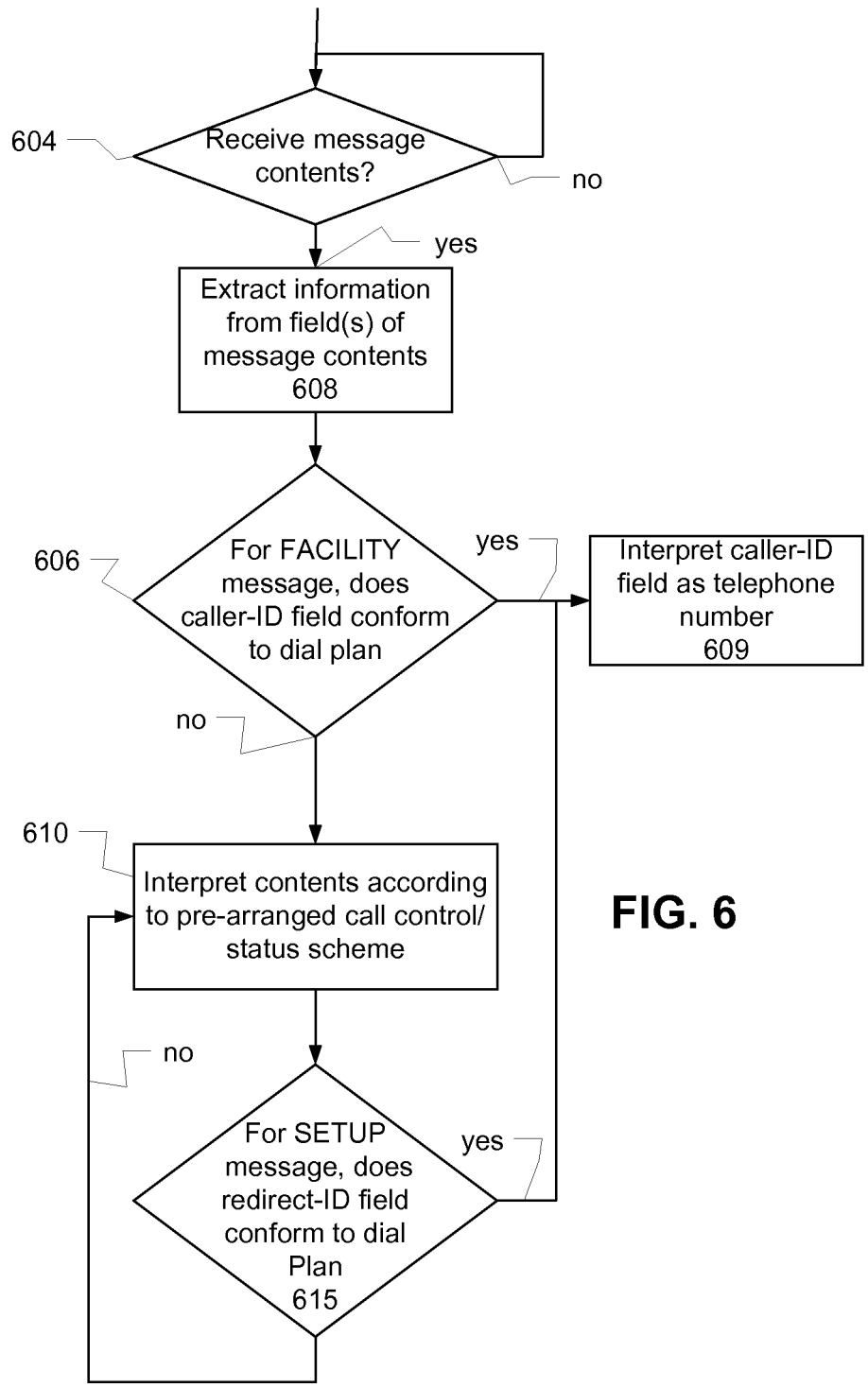
FIG. 6 depicts an example process for receiving commands and status information according to these disclosures.

FIG. 6 depicts an example process of receiving messages according to the examples described herein, and determining whether there is a command or status information relevant for call control within the received message. FIG. 6 depicts that the example process can include receiving a FACILITY or SETUP message (using GSM signaling, if at device 11).

In some implementations, contents of the message can be received, and not an entirety of the message. For example, depending on the particulars of how message information was transmitted, the contents of the message (e.g., the metadata identifying different fields of the message, and including their contents) may arrive, without being explicitly in a Q.931 message format.

The process includes extracting (608) information from the contents/message received, and in an example of a received FACILITY type message, a Display Information Element (information from it) is examined (606) to determine whether the information defines a conforming phone number. If so, then that information can be interpreted as a phone number (609), and used for such purposes as updating a display with the information. However, if the phone number does not conform to a relevant dial plan, then the contents can instead be interpreted (610) according to a call control and/or status update sharing scheme.

A determination as to whether the phone number conforms to a dial plan can be implemented in a number of ways. For example, a mask can be created that defines ranges of invalid digits for each constituent numeral of the telephone number. The mask can be applied to the telephone number, and if the resultant output indicates that any digit of the telephone number is out of the bounds defined by the mask, then the telephone number can be determined invalid. In other implementations, a pre-determined digit can be set to a known invalid value (e.g., the first digit of an area code). Then, only that digit may be examined for the invalidity determination. In this example, where one digit of a telephone number is reserved for use in determining invalidity, and assuming a 10 digit telephone number, a total number of remaining permutations is over 38 million, each of which can be assigned to indicate a particular command or status indicator.

Similarly, for a SETUP message, information from a redirect information element can be examined (615) to determine whether the information can be interpreted as a valid phone number, and if so then the number can be interpreted and used as a phone number (609). Otherwise, the message contents can be used according to the control/status information sharing scheme (610).

In the foregoing, a PBX or a 3PCC server was identified as a device that can participate in the exchange of third party call control and status information. This disclosure is intended to be exemplary, and no limitation is intended on the type or nature of device, or the functionality that must be provided on the device to be able to send and receive status or control information according to these disclosures. Examples of commands that can be sent according to these disclosures include, hold/release, call forward, call record, transfer, park, and camp on. Each of these functions can be assigned a code for use in signaling a desire to implement that command.

In the above disclosure, it was explained that GSM signaling can be used between a mobile device and a switching center of a network used by the mobile device. Such GSM signaling can include a message, with fields having pre-defined meanings. Contents of such a message are preserved, and sent in a message according to SS7 signaling through a Public Switched Telephony Network. The message eventually arrives at a gateway, which interfaces the PSTN to an Internet Protocol network. The gateway provides a transparency descriptor that can preserve SS7 message contents in a SIP message, the contents of which is received by a 3PCC server. The reverse path also is available. These protocols are specifically identified in this description, but it is to be understood that the overall implementation more generally includes that the path from the mobile device to the gateway provides for preservation of contents and metadata (i.e., the typical format and usage of the information in the fields) of ISDN/SS7 messages that come from the gateway directed to the mobile device and GSM messages that originate from the mobile device, and are directed to the gateway (and ultimately, the 3PCC server). As such, it is to be understood that the network elements depicted operate to maintain these field definitions and their contents across different signaling mediums, even though transport and network layer signaling approaches vary.

In the foregoing, separate boxes or illustrated separation of functional elements of illustrated systems does not necessarily require physical separation of such functions, as communications between such elements can occur by way of messaging, function calls, shared memory space, and so on, without any such physical separation. As such, functions need not be implemented in physically or logically separated platforms, although they are illustrated separately for ease of explanation herein.

For example, different embodiments of devices can provide some functions in an operating system installation that are provided at an application layer or in a middle layer in other devices. Different devices can have different designs, such that while some devices implement some functions in fixed function hardware, other devices can implement such functions in a programmable processor with code obtained from a computer readable medium.

Further, some aspects may be disclosed with respect to only certain examples. However, such disclosures are not to be implied as requiring that such aspects be used only in embodiments according to such examples.

The above description occasionally describes relative timing of events, signals, actions, and the like as occurring "when" another event, signal, action, or the like happens. Such description is not to be construed as requiring a concurrency or any absolute timing, unless otherwise indicated.

Certain adaptations and modifications of the described embodiments can be made. Aspects that can be applied to various embodiments may have been described with respect to only a portion of those embodiments, for sake of clarity. However, it is to be understood that these aspects can be provided in or applied to other embodiments as well. Therefore, the above discussed embodiments are considered to be illustrative and not restrictive.

What is claimed is:

1. A telephony system, comprising:
a mobile device with a telephony client responsive to signaling messages of one or more signaling protocols, each signaling message having one or more pre-defined fields received during an ongoing voice communication session, the response including determining whether a received signaling message includes a pre-defined field updated with data, wherein the data is consistent with a standard definition of the field but is undefined according to the standard definition of the field, and is portable across at least two telecommunication signaling formats, and responsive to the determining, interpreting the data in the pre-defined field as control information for use in the ongoing voice communication session using a pre-arranged signaling convention; and
a server with a telephony control module for:
determining that a signaling message is to be carried using the pre-arranged signaling convention of the ongoing voice communication;
in response to the determination, forming the signaling message according to the one or more signaling protocols, the forming respectively comprising providing the pre-defined field with data in the signaling message, indicative of control information, in a format that is consistent with the standard definition of the field but is undefined according to the standard definition of the field, wherein the server is coupled to an Internet Protocol (IP) network capable of tunneling the signaling messages to a network, for reception by the mobile device.

2. A mobile device, comprising:
a network interface;
a processor; and
a computer readable medium coupled to the processor and storing instructions, which when executed by the processor configure the mobile device to:
receive a message, during a voice telephony call, comprising an updated information element according to a pre-defined standardized format;
determine whether the updated information element is consistent with a standard definition of a standard format for the information element but is undefined according to the standard definition of the standard format for the information element, wherein the updated information element is portable across at least two telecommunication signaling formats; and
responsive to determining that the updated information element is consistent with the standard definition of the standard format for the information element but is undefined according to the standard definition of the standard format for the information element, interpret the information element to indicate one or more of control information and status information for the voice telephony call using a pre-arranged signaling convention.

3. The mobile device of claim 2, further comprising an interface, and wherein the method further comprises receiving input through the interface, and forming a message comprising an updated information element with information encoding the input, but which is invalid if interpreted according to a pre-defined standardized format for that information element.

4. A non-transitory, computer readable medium storing instructions for programming a processing module to perform a telecommunication control signaling method using a signaling protocol, the method comprising:
accepting an input from a user interface indicative of a command for controlling an ongoing telephony call;
determining that the command is to be carried using a pre-arranged signaling convention of the ongoing telephony call;
in response to the determination, updating a field of a FACILITY or SETUP message associated with the signaling protocol with information indicative of the command, the information in an arrangement that is consistent with a standard definition of a standard format of information in the field of the message but is undefined according to the standard definition of the standard format of information in the field of the message, wherein the information is portable across at least two telecommunication signaling formats;
interpreting the information using the pre-arranged signaling convention; and
sending the message over a circuit-switched connection to a gateway for tunneling over a packet-switched network.

5. The computer readable medium of claim 4, wherein the message is a FACILITY message, and the field is the caller-ID field of the FACILITY message, and the arrangement of the information comprises a number of digits usually present in a phone number, but selected to differ from an applicable dial-plan, such that the digits can be determined to be an invalid phone number.

6. The computer readable medium of claim 4, wherein the is the SETUP message, and the field is the redirect field of the SETUP message, and the arrangement of the information comprises a number of digits usually present in a phone number, but selected to differ from an applicable dial-plan, such that the digits can be determined to be an invalid phone number.

7. A non-transitory, computer readable medium storing instructions for programming a processing module to perform a telecommunication control signaling method using a signaling protocol, the method comprising:

receiving an updated FACILITY or SETUP message associated with the signaling protocol from a network interface;

extracting contents of a caller-ID field of the FACILITY message or a redirect field of the SETUP message;

determining during an ongoing call, that the extracted contents are consistent with a standardized definition of the fields but undefined according to the standardized definition of the fields, wherein the extracted contents are portable across at least two telecommunication signaling formats; and responsive to the determining, interpreting the extracted contents as a command for implementing a control command using a pre-arranged signaling convention.

8. The computer readable medium of claim 7, wherein the updated message is a FACILITY message, and the field is the caller-ID field of the FACILITY message, and the arrangement of the information comprises a number of digits usually present in a phone number, but selected to differ from an applicable dial-plan, such that the digits can be determined to be an invalid phone number.

9. The computer readable medium of claim 7, wherein the updated Q.931 message is the SETUP message, and the field is the redirect field of the Q.931 SETUP message, and the arrangement of the information comprises a number of digits usually present in a phone number, but selected to differ from an applicable dial-plan, such that the digits can be determined to be an invalid phone number.

* * * * *

UNITED STATES PATENT AND TRADEMARK OFFICE
CERTIFICATE OF CORRECTION

PATENT NO. : 9,185,210 B2  
APPLICATION NO. : 12/971399  
DATED : November 10, 2015  
INVENTOR(S) : Richard John George Page 1 of 1

It is certified that error appears in the above-identified patent and that said Letters Patent is hereby corrected as shown below:

On the title page item 57, Column 2 (Abstract), Line 9, After "forming a" delete "Q.931/932".

In the claims

Column 12, Line 66, In Claim 6, delete "wherein the" and insert -- wherein the message --, therefor.

Column 14, Line 13, In Claim 9, delete "Q.931 message" and insert -- message --, therefor.

Column 14, Line 14, In Claim 9, delete "Q.931 SETUP" and insert -- SETUP --, therefor.

Signed and Sealed this
Nineteenth Day of July, 2016

Michelle K. Lee
*Director of the United States Patent and Trademark Office*